Figure 2:
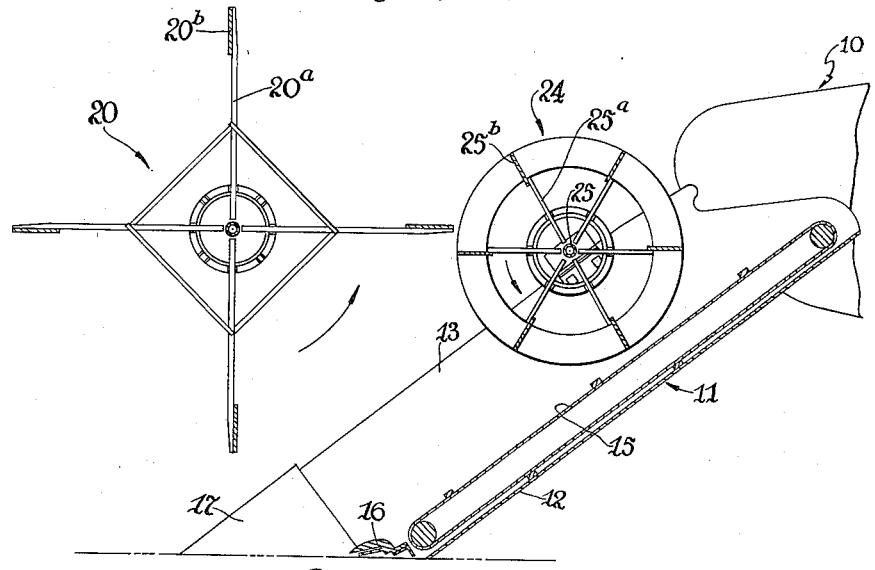

Aug. 24, 1943.  J. R. BROGARD ET AL  2,327,864
HARVESTER
Filed Aug. 11, 1941

Inventors
John R. Brogard
Fred B. DeBlieck

By Paul O. Pippel
Atty.

Patented Aug. 24, 1943

2,327,864

UNITED STATES PATENT OFFICE 2,327,864

HARVESTER

John R. Brogard, St. Joseph, Mo., and Fred B. De Blieck, East Moline, Ill., assignors to International Harvester Company, a corporation of New Jersey Application August 11, 1941, Serial No. 406,263

1 Claim. (Cl. 56—122)

This invention relates to harvester threshers. More particular it relates to a novel reel stripping and grain-feeding device for harvester threshers.

In harvester threshers using a scoop-type platform, it is necessary to pivotally mount the platform on the front of the separator at a sufficiently high point to provide for the necessary range of up and down movement of the platform. When this is done, there is considerable space between the cutting mechanism and the thresher cylinder. While a grain reel is provided on the platform for urging the standing grain into the cutting mechanism, some of the grain is carried out of the feeder by the grain reel and some of the grain that is out of the path of the reel bridges between the sides of the feeder and is not fed into the cylinder. Hence, it is essential that a means be provided on the platform which will strip the grain from the grain reel, prevent bridging of the grain between the sides of the platform, and help move the cut grain into the threshing cylinder in an even flow.

It is, therefore, an important object of the present invention to provide an auxiliary reel attachment on the feeder which will strip the cut grain from the grain reel and hold the cut grain on the feeder conveyer.

Another important object of the present invention is to provide a novel means on the feeder to prevent the grain from bridging between the sides thereof.

Another object of the present invention is to drive the auxiliary reel at a greater speed than the grain reel so that the grain is spread out on the feeder conveyer and moved into the cylinder in an even flow.

According to the present invention, a relatively small diameter auxiliary reel is journaled on the feeder at the rear of the grain reel and above the feeder conveyer. The auxiliary reel is driven in a counter-clockwise direction at a greater speed than the grain reel. The counter-clockwise direction is determined from the left side of the machine. The auxiliary reel strips the grain from the grain reel, holds the cut grain down on the feeder conveyer so that the feeder conveyer may move the cut grain in an even flow into the threshing cylinder.

These and other objects and advantages of the present invention will be apparent to those skilled in the art after a consideration of the following detailed description of the preferred structural embodiment, taken in conjunction with the accompanying drawing.

Figure 1:
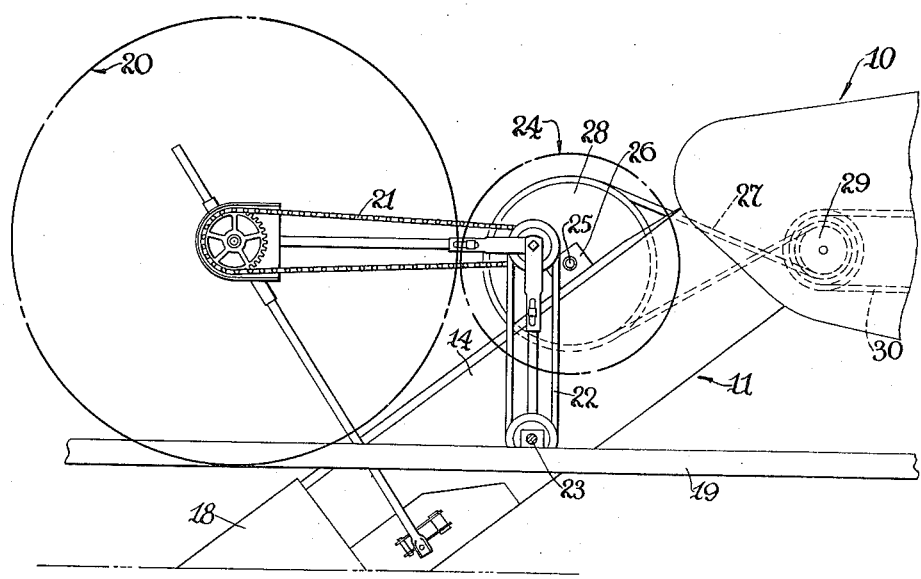

In the drawing:

Figure 1 is a side view of a harvester thresher feeder on which is mounted the novel auxiliary reel device; and Figure 2 is a longitudinal sectional view through the structure shown in Figure 1 and shows the relative position of the auxiliary reel device with respect to the grain reel and the feeder conveyer.

Referring now to the drawing, more particularly to Figure 1, it is to be noted that the harvester thresher chosen to illustrate the principles of the present invention comprises a separator 10, at the front of which is pivotally mounted a feeder 11 which comprises a bottom portion 12, from the longitudinal sides of which extend vertical sides 13 and 14. Above the bottom 12 is mounted a feeder conveyer 15 at the front of which is provided the usual grain-cutting mechanism 16. The forward portions of the side sheets 13 and 14 are provided with points 17 and 18 which divide the grain as the machine passes over the field. As shown in Figure 1, a suitable draft device 19 extends from the separator 10 at one side of the feeder 11 and is adapted to be connected to a tractor or any other suitable source of traction power.

A grain reel 20 is carried by the feeder 11 immediately above and ahead of the cutting mechanism 16. The reel 20 comprises a plurality of radially extending reel arms 20a at the outer ends of which are secured reel bats 20b. The reel 20 is adapted to be driven in the direction of the arrow through a chain 21 and a belt 22 which extends from a shaft 23 that may be driven either from the ground wheels supporting the separator 10 or from the drive means provided for driving the parts of the harvester.

An auxiliary reel 24 is mounted on the vertical side sheets 13 and 14 to the rear of the reel 20 and above the feeder conveyer 15, as shown in Figures 1 and 2. The reel 24 comprises a transversely disposed shaft 25 which is journaled in suitable bearings 26 provided on each of the side sheets 13 and 14. A plurality of reel arms 25a extends radially from the shaft 25. Reel bats 25b are secured to the outer ends of the arms 25a. The auxiliary reel 24 is driven in the direction of the arrow shown in Figure 2 at a speed greater than the speed of the grain reel. When the machine is in operation, the reel 20 rotates in a counter-clockwise direction and urges the standing grain into the cutting mechanism 16 which cuts the grain. Since the machine is traveling forwardly, the grain then falls on the feeder conveyer 15 which conveys it into the separator 10. However, some of the grain is of such a height that it tends to bend around the bats of the reel 20 so as to be carried out of the feeder 11. This is entirely eliminated by the auxiliary reel 24, since it also rotates in a counter-clockwise direction. The auxiliary reel 24 is mounted adjacent the reel 20 and strips the grain from the bats of the reel 20 and also urges the grain downwardly onto the feed conveyer 15 so that the conveyer 15 may carry it into the separator 10. The auxiliary reel 24, in the present case, is adapted to be driven from a belt 27 which is trained around a pulley 28 secured to one end of the shaft 25 and a pulley 29 provided on the upper roll of the conveyer 15. The pulley 29 is driven from a belt 30 which is trained around any suitable source of power for the thresher.

In view of the above description, it should be apparent that a novel grain-stripping and grain-holding device has been provided for a harvester thresher feeder. The auxiliary reel feeder strips the cut grain from the grain reel 20 and holds the cut grain on the feeder conveyer 15. Bridging of the grain between the side sheets 13 and 14 is also eliminated.

While only a preferred construction embodying the principles of the present invention has been shown and described, it is to be understood that the invention is not to be limited to the specific details shown and described, but that, in effect, widely different means may be employed in the practice of the broader aspects of this invention.

What is claimed is:

In a harvester thresher, a separator, a scoop-type platform feeder pivotally mounted on the separator, grain-cutting means mounted on the feeder, a conveyer mounted on the scoop-type platform feeder at the rear of the cutting means for conveying cut grain into the separator, a first rotatable reel carried by the feeder and positioned above the cutting means for urging the standing grain into the cutting means, and a second rotatable reel carried by the feeder and positioned closely adjacent the rear of the first reel and closely above the conveyer whereby the grain is stripped from the first reel and forced down on the conveyer.

JOHN R. BROGARD.
FRED B. DE BLIECK.